Patented June 21, 1932

1,864,046

UNITED STATES PATENT OFFICE

MAX E. LANGE, OF CLEVELAND HEIGHTS, OHIO, ASSIGNOR TO THE WARNER & SWASEY COMPANY, OF CLEVELAND, OHIO, A CORPORATION OF OHIO

WORK SUPPORT FOR MACHINE TOOLS

Application filed October 28, 1930. Serial No. 491,729.

This invention relates to a work support for machine tools of the type commonly consisting of a plurality of rollers to take the thrust of the work during the cutting or turning operation. Generally the rollers and tool are mounted upon a bracket, in some instances carried by the tool holding slide and in other instances secured to the face of the turret. A device of this kind is therefore in the form of a tool holding and work supporting unit which is commonly called, and is known in the trade as a universal turning tool. In other instances, the bracket supporting the rollers may be in the form of a steady rest supported upon the bed or ways of the machine while the cutting tool may be independently supported on a slide also supported upon the bed or ways of the machine.

In a device of this kind, the rollers are carried by slides or equivalent members and the tool is also carried by a slide, all adjustably mounted on the same bracket or support, or on individual brackets or supports to enable the necessary adjustments to be made for work pieces of different diameters. Heretofore it has been customary to provide the rollers with plain bearings which necessarily were of limited diameter due to the small size of the rollers to permit such rollers to support work of small diameter. But with the introduction of high speed cutting tools, which enable the work to be speeded up very materially and the size of the cuts to be increased, the necessarily small bearings have not answered the requirements because of the high speeds at which the rollers were rotated and the severe pressures to which the bearings were subjected. In brief, the bearings would in a short time "freeze up", thus making it necessary to revolve the work at slower speeds and to take cuts of less depth, resulting in the operation of the machine at considerably less than its highest efficiency or capacity permissible with the harder and more efficient high speed tool.

To provide bearings for these thrust resisting rollers which would take the load satisfactorily has presented a problem difficult of solution. If the rollers were made of sufficient size to admit the use of a suitable plain or anti-friction bearing so much space would be occupied by the rollers of the large size that it would be impossible to use them for work pieces of small diameters, that is to say, there would not be sufficient space to admit the use of two rollers of the larger size when the members carrying the rollers were adjusted inwardly sufficiently to enable the rollers to engage the surface of the work piece when the latter was of small diameter.

This problem has been solved very effectively by the present invention which has for its chief object to permit the use of plain or anti-friction bearings of ample size and therefore of thrust resisting rollers large enough to accommodate suitable plain or anti-friction bearings and, at the same time, enable these rollers to be employed with work pieces of the smallest diameters, as well as of the larger diameters.

This object is attained by changing the location of these rollers with their bearings, i. e., by mounting them outwardly of the work and interposing between the work and the peripheries of these rollers relatively small rollers which engage the work and transmit the thrust to the larger rollers. These smaller rollers may be loosely supported if desired since their bearings present no problems whatsoever, the rollers acting merely to transmit the thrust, the bearings themselves taking no appreciable load.

The invention may be further briefly summarized as consisting in certain novel combinations and arrangements of parts which will be described in the specification and set forth in the appended claims.

In the accompanying sheets of drawings wherein I have illustrated several slightly different forms of my invention, all embodying however the same general novelty which constitutes the essence of the present invention, Figure 1 is a front elevation of the tool and work holding unit, a cylindrical work piece of maximum size permitted by the unit being shown by full lines in section, and a work piece of minimum size by dotted lines;

Fig. 7 is a view corresponding to Figs. 3 and 5 showing a still further modification wherein two of the relatively large rollers with their anti-friction bearings are associated with one of the smaller rollers which is adapted to engage the work and transmit the thrust of the work to the two larger rollers;

Fig. 8 is a view showing a portion of the roller and tool supporting bracket with a further modification, particularly in the manner of supporting the relatively large roller with its anti-friction bearing and the relatively small roller which is between the larger roller and the work; and Fig. 9 is a side elevation of the device shown in Fig. 8 with the supporting links of Fig. 8 in section.

It should be understood that although the invention has been illustrated as applied to a work support in the form of a universal turner supported by a turret slide, it is equally as applicable to a steady rest or similar device which is supported upon the bed or upon a slide of a machine tool. It should further be understood that, where anti-friction bearings have been illustrated, plain bearings of sufficient size may be employed.

Figure 2:
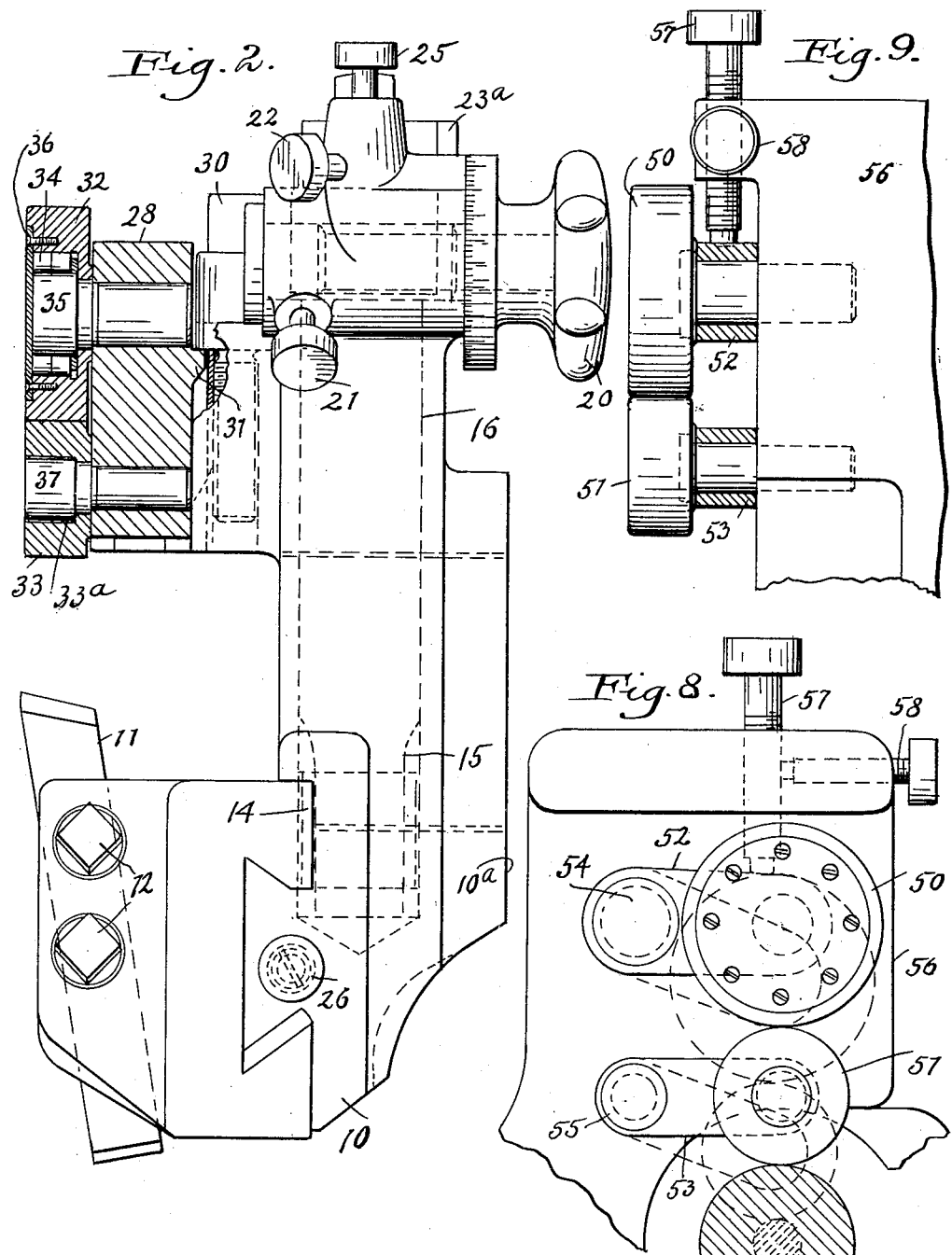
Fig. 2 is a side view of the same, with a portion in section, substantially along the line 2—2 of Fig. 1.

Referring now to the drawings, 10 represents a bracket which is adapted to be secured in any suitable manner in a tool holding slide, but generally to one face of the tool holding turret, such for example as is commonly employed on turret lathes, the bracket having a face 10$^a$, Fig. 2, which is adapted to be clamped against the face of the turret by suitably provided bolts. The cutting tool 11 is secured by bolts 12 in the tool receiving portion of a slide 13 which generally has a dovetail connection with the lower part of bracket 10, as indicated in Fig. 2. Any suitable means may be provided for adjusting the slide to adapt it for work pieces W of varying diameters but, in this instance, the slide is provided with a series of rack teeth indicated at 14 and these are engaged by gear teeth 15 at the lower end of a vertical shaft 16 which is mounted in a column 17 forming a part of the bracket. Near its upper end the shaft has worm teeth formed thereon as is indicated at 18, these being engaged by a worm 19 on a short shaft having a knob 20 by which it may be turned manually. A set-screw 21 is shown for locking the worm in any desired position. A second set-screw 22 is provided for holding the shaft 16 against rotation by the thrust of the work on the tool. In this instance, the upper end of the shaft has a tapered portion engaged by a collar 23 which may be clamped tight against the end of the shaft by a set-screw 24. This collar has a laterally projecting lug indicated at 23$^a$ in Fig. 2 which the end of the set-screw 22 is adapted to engage. The third set-screw 25 locks the set-screw 22 against accidental turning. The lower part of the bracket is generally provided with a spring, such as indicated at 26, to exert a force to hold the tool in an outward direction so that the tool will not tend to spring inward if the point of the tool comes to a recess in the work piece. This spring extends through the dovetail portion of the bracket and has its outer end suitably secured to the bracket and its inner end suitably secured to the inner portion of the tool carrying slide 13.

Figure 1:
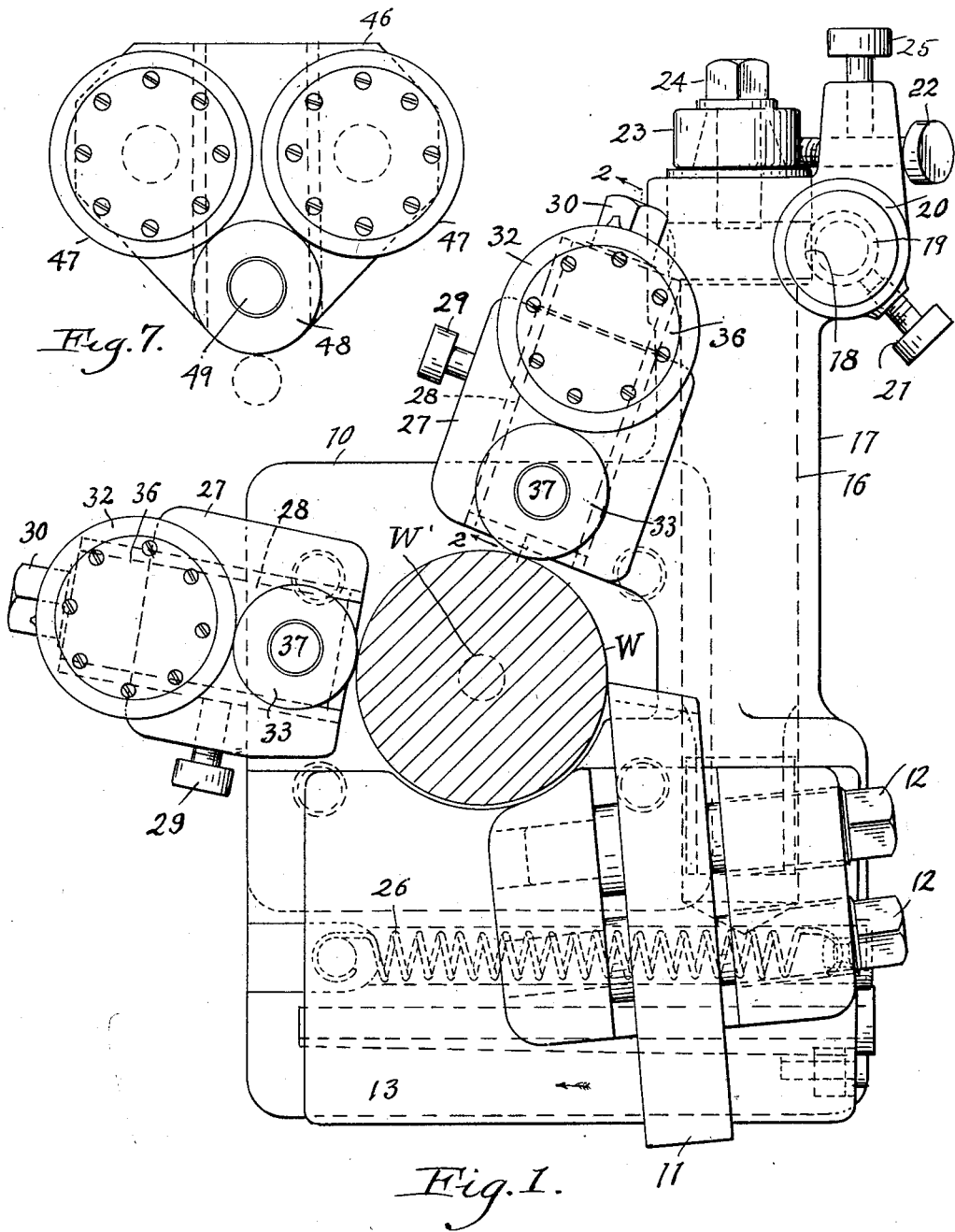
Figure 4:
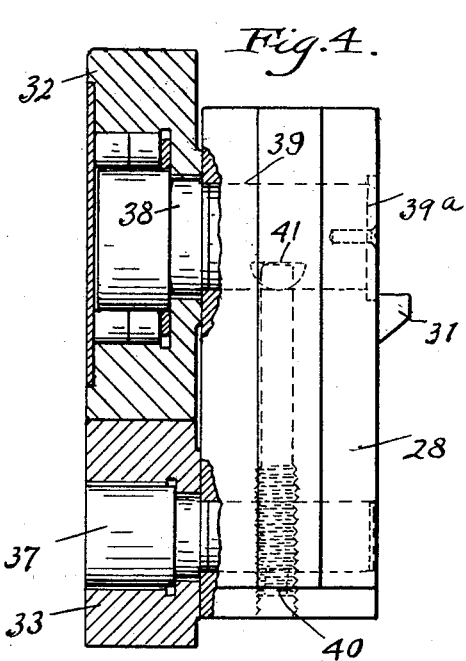
Fig. 4 is a side elevation with the rollers themselves in section substantially along the line 4—4 of Fig. 3.

Coming now to the parts more directly involving the present invention, the bracket of Figs. 1 and 2 is provided with portions 27 forming guideways for a pair of slides 28, the parallel lengthwise edge faces of the slides having tongues which engage in guide grooves formed in the sides of the guideways so that the slides will have true radial movements with respect to the center line of the work piece when they are adjusted inward or outward. In the normal functioning of the device, these slides are, of course, stationary and they may be locked in position by set-screws 29, or by equivalent means. To take the outward or radial thrust on the slides, I may provide for each slide an adjustable shouldered screw 30, a shoulder of the screw being adapted to engage a shoulder 31 on the rear face of the slide, as indicated in Figs. 2 and 4.

Each slide carries two rollers 32 and 33. The outer roller 32 is larger than the inner roller and has, as illustrated, a suitable anti-friction bearing 34 on a supporting pin 35 having a shank which is pressed into an opening of the slide or otherwise fixedly held therein. The bearing 34 may be of any suitable type, either plain or of the anti-friction type and of the roller type as herein indicated, or of the ball type. That is to say, a conventional anti-friction bearing may be employed, including the rollers or balls and a suitable retainer or holder which in this instance is shown held in place by a front plate 36.

Roller 33, which is smaller than roller 32, as above stated, is mounted on a pin 37 which is also pressed into an opening of the slide or otherwise tightly held therein. The real purpose of this pin is to keep the roller in position since it has a clearance, indicated at 33$^a$, between its inner bore and the supporting surface of the pin. In practice, no load is transmitted between the roller and its supporting pin 37, except a very slight side thrust caused by the rolling action of the work.

When this device is in operation, the slides 28 are adjusted inwardly until the peripheral surfaces of the rollers 33 simultaneously engage the cylindrical surface of the work piece and the peripheral surfaces of the outer rollers 32, the rollers 33 then having no thrust relation with the retaining pins 37. At least no thrust or load of any material respect is transmitted from the rollers to the pins 37. On the other hand, the thrust of the work is transmitted through these rollers 33 to the outer rollers 32, thus thrust being then transmitted by the anti-friction bearings to the pins supporting the rollers 32.

With this improvement the inner rollers 33 may be made small enough that the slides can be adjusted inwardly to support the work pieces of any diameter from the maximum diameter W, indicated by full lines in Fig. 1, to the minimum diameter W', indicated by the dotted lines. That is to say, there will be no interference between the rollers for any diameters of work pieces between the limits indicated. At the same time, the rollers which take the thrust can be made large enough to receive anti-friction bearings of ample size for the load. Accordingly, with this unit the work can be rotated at the maximum speed and cuts of maximum depth can be taken permitted by the hardest and most durable tools available, and the bearings of the rollers which take the thrust of the work will be able to stand up under the load for an indefinite period of time.

I have not endeavored to show provision for lubricating the bearings as this can be accomplished in any desired manner and presents no problem.

Figure 3:
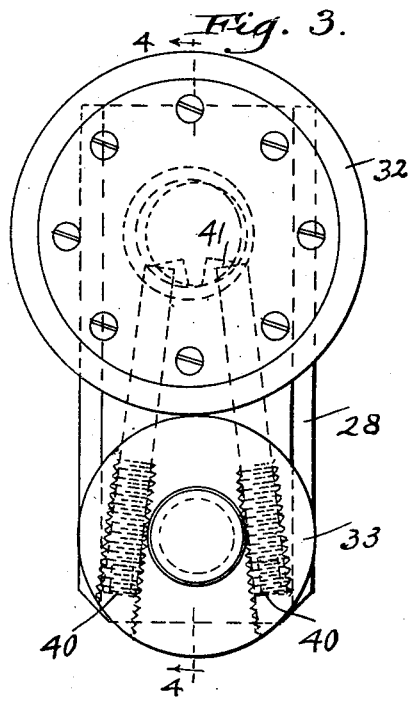
Fig. 3 is a front elevation of the slide and the two rollers carried thereby detached from the bracket and showing a slight modification.

It is sometimes difficult to mount the pins 35 and 37 in the slide so that when the inner roller of each pair is in thrust transmitting relation with the work piece and with the outer roller, there will be the desired clearance between the inner bore of the inner roller and its retaining pin 37. Accordingly, it is sometimes desirable or may be desirable to make provision for adjusting the spacing of the pins which support the two rollers on each slide. Provision for doing this is shown in Figs. 3, 4, 5 and 6. In Figs. 3 and 4 the outer roller is mounted on a pin 38 having a head and a shank 39, one of which is eccentric with respect to the other. The distance between the surfaces of the two rollers may be adjusted in one direction or the other by turning the outer pin by means of a pair of adjusting screws 40 which are mounted in the slide and inner ends of which engage shoulders 41 formed on the shank 39 of the pin. Obviously by adjusting these screws the pin can be turned in the slide so as to move the surface of the outer roller slightly toward or away from the surface of the inner roller. In this event the shank will not have a drive fit in the slide and the same may be held in place by any other suitable means, such as by a washer and a retaining screw engaging the inner end of the shank as indicated in Fig. 4.

Figure 5:
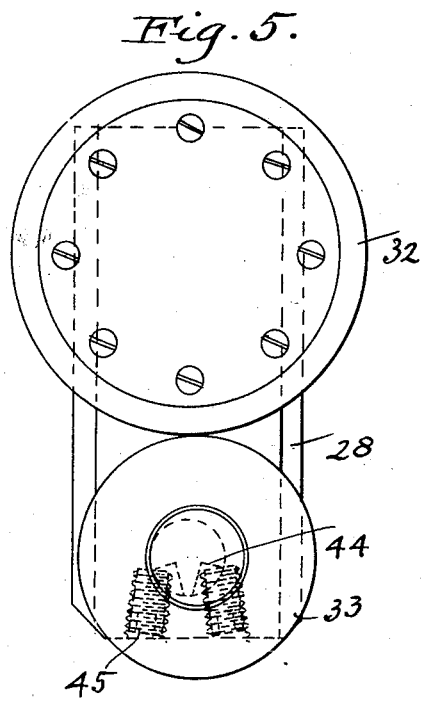
Figs. 5 and 6 are views corresponding to Figs. 3 and 4 showing a slight modification.
Figure 6:
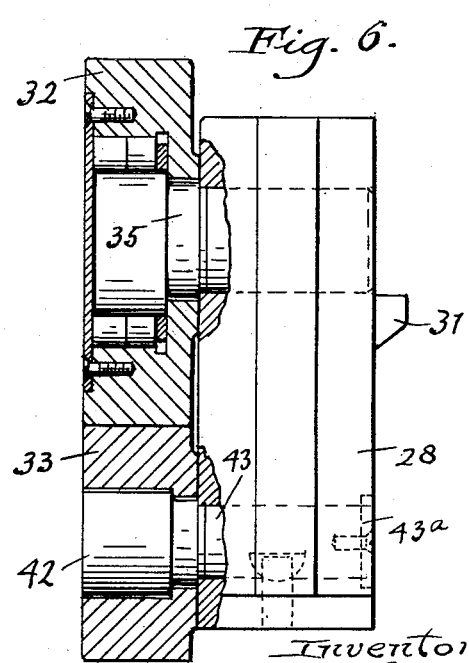

In Figs. 5 and 6 adjustment is given for this same purpose to the inner or smaller roller, the retaining pin of this roller having a head 42 and a shank 43, one of which is eccentric with respect to the other. The shank has shoulders indicated at 44 which are engaged by relatively short adjustable screws 45 which may be adjusted to vary the position of the inner roller with respect to the outer roller. In this instance the retaining pin may be held in the slide by a screw and washer 43ª engaging the inner end of the shank as is done for the supporting pin of the outer roller of Figs. 3 and 4.

My invention may be embodied in still additional modified forms. For example, if desired the inner work engaging roller may transmit the thrust of the work to two outer rollers having anti-friction bearings. This is indicated in Fig. 7 where the slide is shown at 46 and the two relatively large rollers with anti-friction bearings are shown at 47. These bearings may be mounted identically as in Figs. 1 and 2. Associated with these two rollers is an inner and relatively small roller 48 which is adapted to simultaneously engage the surface of the work piece and the peripheral surfaces of the two outer rollers, the roller 48 having a slight clearance on its retaining pin 49, precisely as described above in connection with Figs. 1 and 2. It will be understood of course that the unit will have two such slides and sets of rollers as indicated in Fig. 7, the two inner rollers 48 having the same relationship with respect to the work and the tool as indicated in Fig. 1.

It is not essential to my invention that the rollers be mounted on adjustable slides as they may be supported and held in operative relation with respect to each other and with respect to the work piece by other means. For example, in Figs. 8 and 9 I have shown a modification wherein the outer roller 50 and the inner roller 51 are mounted on arms 52 and 53 pivotally connected by pins 54 and 55 directly to the bracket which is here designated 56. It will be understood that there will be two or more such pairs of rollers arranged as in Fig. 1, and it will be understood also that the inner roller simply transmits the thrust from the work piece to the peripheral surface of the outer roller and therefore may have a plain bearing on a pin at the outer or free end of the arm 53 with a slight clearance if desired, while the outer and larger roller 50 may have a suitable plain or anti-friction bearing on the pin at the free end of the arm 52, precisely like the antifriction bearing of Figs. 1 and 2 or the equivalent thereof. The thrust which is transmitted to the outer roller 50 and through its anti-friction bearing to the pivoted arm 52 is in turn transmitted from the arm to the bracket 56 by an adjustable set-screw 57 which is locked in place after adjustment by a lock-screw 58.

It should be understood that when the invention is applied to a steady rest, three or more sets of the units preferably are employed.

It should further be appreciated that it is within the concept of the present invention to arrange in series between the outer and inner rollers of each unit, intermediate rollers having peripheral engagement with both the inner and outer rollers.

Thus it will be seen that the object of the invention is attained by a structure which answers the requirements but is nevertheless simple and durable in construction, and it will also be seen that my invention is susceptible of various modifications, some of which I have illustrated, but others may occur to one skilled in the art. I, therefore, aim in my claims to cover all modifications and changes which do not involve a departure from the spirit and scope of the invention.

Having thus described my invention I claim:

1. In a work and tool holding unit, a cutting tool for engagement with a work piece, and thrust-resisting means including an inner roller engageable with the work piece and an outer roller engageable with the periphery of the inner roller.

2. In a work and tool holding unit, a cutting tool for engagement with a work piece, and thrust-resisting means including an inner roller engageable with the work piece and an outer roller engageable with the periphery of the inner roller, the outer roller having an anti-friction bearing.

3. In a tool holding and work supporting device, a work engaging cutting tool, and means for taking the thrust of the work comprising a relatively large outer roller and a relatively small inner roller between the outer roller and the work piece and adapted to engage both of the latter.

4. In a tool holding and work supporting device, means for supporting a cutting tool for engaging a work piece, and means for taking the thrust of the work comprising an outer roller having an anti-friction bearing, and a relatively small free running roller between the first named roller and the work piece and adapted to engage both the latter.

5. A tool holding and work supporting unit comprising a bracket having means for supporting a cutting tool engageable with a work piece, and thrust resisting means supported by the bracket and including two engaging rollers consisting of an outer roller with anti-friction bearings, and a roller intermediate the first named roller and the work piece for engagement with both of the same.

6. In a combined tool holding and work supporting device, a bracket adapted to be secured to a turret or the like having means for supporting a cutting tool engageable with the work piece, and means for taking the thrust of the work piece comprising two rollers supported by the bracket and consisting of an outer relatively large roller and an inner relatively small roller intermediate the first named roller and the work piece and simultaneously engageable with both of the same.

7. A tool holding and work supporting unit comprising a bracket adapted to be secured to a turret or the like, and an adjustable tool holding member carried by the bracket and two adjustable pairs of thrust resisting rollers carried by the bracket each pair of rollers including an outer relatively larger roller and an inner relatively small roller between the latter and the work piece and simultaneously engageable with both the same.

8. In a work rest for a machine tool, thrust-resisting means including an inner roller adapted to engage a work piece and an outer roller engageable wtih the periphery of the inner roller.

9. In a work rest for a machine tool, a bracket, and thrust-resisting means on said bracket including a relatively small inner roller adapted to engage a work piece and a relatively large outer roller engageable with the periphery of the inner roller.

10. In a tool and work rest for a machine tool, means for supporting a tool, and thrust-resisting means including an inner roller adapted to engage a work piece and an outer roller engageable with the periphery of the inner roller.

11. In a work rest for a machine tool, a thrust-resisting means including an inner roller adapted to engage a work piece and an outer roller engageable with the periphery of the inner roller, and means for adjusting said rollers relative to each other.

12. In a tool and work rest for a machine tool, means for supporting a tool, and thrust resisting means including an inner roller adapted to engage a work piece and an outer roller engageable with the periphery of the inner roller, and means for adjusting said rollers relative to each other.

13. In a work rest for a machine tool, a frame, a member movable on said frame, and thrust-resisting means supported on said member including an inner roller adapted to engage a work piece and an outer roller engageable with the periphery of the inner roller.

14. In a work rest for a machine tool, a frame, a member movable on said frame, and thrust-resisting means supported on said member including an inner roller adapted to engage a work piece, an outer roller engageable with the periphery of the inner roller, and means for adjusting said rollers relative to each other.

15. In a work rest for a machine tool, a thrust-resisting means including an inner roller adapted to engage a work piece, and a plurality of outer rollers engageable with the periphery of the inner roller.

16. In a work rest for a machine tool, the combination of a frame, a member movable on said frame, and thrust-resisting means supported on said member and including an inner roller adapted to engage a work piece and a plurality of outer rollers engageable with the periphery of the inner roller.

In testimony whereof I hereunto affix my signature.

MAX E. LANGE.